United States Patent [19]

Moy et al.

[11] Patent Number: 5,925,448
[45] Date of Patent: Jul. 20, 1999

[54] FILM EXTRUDED FROM A BLEND OF ETHYLENE COPOLYMERS

[75] Inventors: Francis H. Moy, Belle Mead; William James Michie, Jr., Raritan, both of N.J.

[73] Assignee: Union Carbide Chemicals & Plastics Technology Corporation, Danbury, Conn.

[21] Appl. No.: 08/675,602

[22] Filed: Jul. 3, 1996

Related U.S. Application Data

[60] Provisional application No. 60/006,269, Nov. 7, 1995.

[51] Int. Cl.$^6$ .............................. B32B 7/02; C08L 23/00; C08L 23/04
[52] U.S. Cl. ............................................ 428/220; 525/240
[58] Field of Search ............................ 525/240; 428/332, 428/220

[56] References Cited

U.S. PATENT DOCUMENTS

| | | | |
|---|---|---|---|
| 4,525,322 | 6/1985 | Page et al. | 525/240 |
| 4,536,550 | 8/1985 | Moriguchi et al. | 526/352 |
| 4,705,829 | 11/1987 | Kwack et al. | 525/240 |
| 4,814,135 | 3/1989 | Heitz | 264/564 |
| 5,149,738 | 9/1992 | Lee et al. | 525/240 |
| 5,210,142 | 5/1993 | Kale et al. | 525/240 |
| 5,514,455 | 5/1996 | Michie et al. | 525/240 |

FOREIGN PATENT DOCUMENTS

WO94-12568  6/1994  WIPO.

*Primary Examiner*—Edward J. Smith
*Attorney, Agent, or Firm*—Saul R. Bresch

[57] ABSTRACT

A film comprising a blend of (i) a linear low density polyethylene and (ii) an in situ blend of copolymers of ethylene and one or more alpha-olefins having 3 to 8 carbon atoms wherein (a) the weight ratio of component (i) to component (ii) is in the range of about 0.01:1 to about 6:1; (b) the blend has been extruded, under extrusion conditions, at a die rate in the range of about 6 to about 20 pounds per hour per inch of die circumference and at a die gap in the range of about 0.020 to about 0.075 inch; and (c) the film exhibits essentially no melt fracture.

2 Claims, No Drawings

FILM EXTRUDED FROM A BLEND OF ETHYLENE COPOLYMERS

This application claims the benefit of United States Provisional Application numbered 60/006,269 filed on Nov. 7, 1995.

TECHNICAL FIELD

This invention relates to film extruded from a blend of (i) conventional linear low density polyethylene and (ii) an in situ blend of ethylene copolymers prepared in a series of polymerization reactors.

BACKGROUND INFORMATION

There has been a rapid growth in the market for linear low density polyethylene (LLDPE), particularly resin made under mild operating conditions, typically at pressures of 100 to 300 psi and reaction temperatures of less than 100° C. This low pressure process provides a broad range of LLDPE products for blown and cast film, injection molding, rotational molding, blow molding, pipe, tubing, and wire and cable applications. LLDPE has essentially a linear backbone with only short chain branches, about 2 to 6 carbon atoms in length. In LLDPE, the length and frequency of branching, and, consequently, the density, is controlled by the type and amount of comonomer used in the polymerization. Although the majority of the LLDPE resins on the market today have a narrow molecular weight distribution, LLDPE resins with a broad molecular weight distribution are available for a number of non-film applications.

LLDPE resins designed for commodity type applications typically incorporate 1-butene as the comonomer. The use of a higher molecular weight alpha-olefin comonomer produces resins with significant strength advantages relative to those of ethylene/1-butene copolymers. The predominant higher alpha-olefin comonomers in commercial use are 1-hexene, 4-methyl-1-pentene, and 1-octene. The bulk of the LLDPE is used in film products where the excellent physical properties and drawdown characteristics of LLDPE film makes this film well suited for a broad spectrum of applications. Fabrication of LLDPE film is generally effected by the blown film and slot casting processes. The resulting film is characterized by excellent tensile strength, high ultimate elongation, good impact strength, and excellent puncture resistance.

LLDPE, however, due to an inherent molecular structure/melt rheology characteristic, is highly susceptible to melt fracture, a phenomenon, whereby, on exiting an extruder die, the extrudate has a highly irregular surface. LLDPE is particularly vulnerable to melt fracture at die rates in excess of about 4 pounds per hour per inch of die circumference and at die gaps in the range of about 0.020 to about 0.075 inch.

DISCLOSURE OF THE INVENTION

An object of this invention, therefore, is to provide a film containing a defined weight proportion of LLDPE, which has been extruded at the die rate and die gap mentioned above with essentially no melt fracture.

Other objects and advantages will become apparent hereinafter.

According to the present invention such a film has been discovered, the film comprising a blend of (i) a linear low density polyethylene and (ii) an in situ blend of copolymers of ethylene and one or more alpha-olefins having 3 to 8 carbon atoms wherein (a) the weight ratio of component (i) to component (ii) is in the range of about 0.01:1 to about 3:1; (b) the blend has been extruded, under extrusion conditions, at a die rate in the range of about 6 to about 20 pounds per hour per inch of die circumference and at a die gap in the range of about 0.020 to about 0.075 inch; and (c) the film exhibits essentially no melt fracture.

DESCRIPTION OF THE PREFERRED EMBODIMENT(S)

The gauge or thickness of the film can be in the range of about 0.5 to about 6 mils, and is preferably in the range of about 0.75 to about 2.5 mils. The optimum gauge is about 1.5 mil. As noted, the film can be extruded at a die rate in the range of about 6 to about 20 pounds per hour per inch of die circumference and at a die gap in the range of about 0.020 to about 0.075 inch. Preferably, the film is extruded at a die rate in the range of about 8 to about 15 pounds per hour per inch of die circumference and at a die gap in the range of about 0.035 to about 0.050 inch. The weight ratio of component (i), i.e., LLDPE, to component (ii), i.e., in situ blend, can be in the range of about 0.01:1 to about 3:1, and is preferably in the range of about 1:1 to about 3:1.

As noted, the film is formed by extrusion. The extruder is a conventional one using a die, which will provide the desired gauge. Examples of various extruders, which can be used in forming the film are the single screw type modified with a blown film die and air ring and continuous take off equipment. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and multiple heating zones from the rear heating zone to the front heating zone, the multiple sections and zones running from upstream to downstream. If it has more than one barrel, the barrels are connected in series. The length to diameter ratio of each barrel is in the range of about 16:1 to about 30:1. The extrusion can take place at temperatures in the range of about 150 to about 280 degrees C., and is preferably carried out at temperatures in the range of about 190 to about 250 degrees C.

The blend, which is used in the extruder, is a mixture of a conventional linear low density polyethylene and an in situ blend produced in two staged reactors connected in series wherein a mixture of resin and catalyst precursor is transferred from the first reactor to the second reactor in which another copolymer is prepared and blends in situ with the copolymer from the first reactor.

The conventional linear low density polyethylene (LLDPE) can be a copolymer of ethylene and one or more alpha-olefins having 3 to 12 carbon atoms, and preferably 3 to 8 carbon atoms. These polymers can be produced by processes described in U.S. Pat. Nos. 4,101,445; 4,302,565; and 4,508,842. LLDPE, typically, has a density in the range of 0.900 to 0.940 gram per cubic centimeter, and preferably 0.915 to 0.925 gram per cubic centimeter; a melt index in the range of about 0.3 to about 3 grams per 10 minutes; and an Mw/Mn ratio in the range of about 3 to about 8.

With regard to the in situ blend:

Component (ii) is produced in situ by contacting ethylene and at least one alpha-olefin comonomer with a magnesium/titanium based catalyst system in each of two reactors connected in series, under polymerization conditions, wherein a relatively high molecular weight polymer is formed in the first reactor and has a flow index in the range of about 0.01 to about 30 grams per 10 minutes and a density in the range of 0.860 to 0.940 gram per cubic centimeter and a relatively low molecular weight polymer is formed in the second reactor and has a melt index in the range of about 50 to about 3000 grams per 10 minutes and a density in the range of 0.900 to 0.970 gram per cubic centimeter, the weight ratio of high molecular weight polymer to low molecular weight polymer preferably being in the range of about 0.67:1 to about 1.5:1.

More particularly, the copolymers produced in each of the reactors are copolymers of ethylene and one or more alpha-olefin comonomers having 3 to 8 carbon atoms, preferably one or two alpha-olefins. The relatively high molecular weight copolymer is produced in what is referred to as the high molecular weight reactor, and the relatively low molecular weight copolymer is produced in what is referred to as the low molecular weight reactor. The alpha-olefins are exemplified by propylene, 1-butene, 1-hexene, 4-methyl-1-pentene, or 1-octene. Any of the aforementioned comonomers can be used in either reactor.

Preferred comonomer combinations (first reactor/second reactor) are 1-hexene/1-butene; 1-butene/1-butene; 1-butene/1-hexene; and 1-hexene/1-hexene combinations.

It will be understood that generally the in situ blend can be characterized as a multimodal resin, usually bimodal or trimodal. In some cases, however, the two components making up the blend are sufficiently close in average molecular weight that there is no discernible discontinuity in the molecular weight curve.

The properties of these resins are strongly dependent on the proportion of the high molecular weight component, i.e., the low melt index component. For a staged reactor system, the proportion of the high molecular weight component is controlled via the relative production rate in each reactor. The relative production rate in each reactor can, in turn, be controlled by a computer application program, which monitors the production rate in the reactors (measured by heat balance) and then manipulates the ethylene partial pressure in each reactor and catalyst feed rate in order to meet the production rate, the production rate split, and catalyst productivity requirements.

The magnesium/titanium based catalyst system, which can be used to produce the in situ blend can be exemplified by the catalyst system described in U.S. Pat. No. 4,302,565 although the precursor is preferably unsupported. Another preferred catalyst system is one where the precursor is formed by spray drying and used in slurry form. Such a catalyst precursor, for example, contains titanium, magnesium, and an electron donor, and, optionally an aluminum halide. The precursor is introduced into a hydrocarbon medium such as mineral oil to provide the slurry form. See U.S. Pat. No. 5,290,745.

The electron donor, if used in the catalyst precursor, is an organic Lewis base, liquid at temperatures in the range of about 0° C. to about 200° C., in which the magnesium and titanium compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of titanium compound and electron donor, the reaction product finally contains about 1 to about 20 moles of electron donor per mole of titanium compound and preferably about 1 to about 10 moles of electron donor per mole of titanium compound.

An activator compound, which is generally used with any of the titanium based catalyst precursors, can have the formula $AlR_aX_bH_c$ wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminum mono- and dichlorides wherein each alkyl radical has 1 to 6 carbon atoms and the trialkylaluminums. A particularly preferred activator is a mixture of diethylaluminum chloride and tri-n-hexylaluminum. About 0.10 to about 10 moles, and preferably about 0.15 to about 2.5 moles, of activator are used per mole of electron donor. The molar ratio of activator to titanium is in the range of about 1:1 to about 10:1 and is preferably in the range of about 2:1 to about 5:1.

The hydrocarbyl aluminum cocatalyst can be represented by the formula $R_3Al$ or $R_2AlX$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum dihydride, diisobutyl-hexylaluminum, isobutyl dihexylaluminum, trimethyl-aluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, and ethylaluminum sesquichloride. The cocatalyst compounds can also serve as activators and modifiers.

As noted above, it is preferred not to use a support. However, in those cases where it is desired to support the precursor, silica is the preferred support. Other suitable supports are inorganic oxides such as aluminum phosphate, alumina, silica/alumina mixtures, silica modified with an organoaluminum compound such as triethylaluminum, and silica modified with diethyl zinc. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of titanium per gram of support and preferably about 0.4 to about 0.9 millimole of titanium per gram of support. Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in liquid form.

Activators can be added to the precursor either before and/or during polymerization. In one procedure, the precursor is fully activated before polymerization. In another procedure, the precursor is partially activated before polymerization, and activation is completed in the reactor. Where a modifier is used instead of an activator, the modifiers are usually dissolved in an organic solvent such as isopentane and, where a support is used, impregnated into the support following impregnation of the titanium compound or complex, after which the supported catalyst precursor is dried. Otherwise, the modifier solution is added by itself directly to the reactor. Modifiers are similar in chemical structure and function to the activators. For variations, see, for example, U.S. Pat. No. 5,106,926. The cocatalyst is preferably added separately neat or as a solution in an inert solvent, such as isopentane, to the polymerization reactor at the same time as the flow of ethylene is initiated.

U.S. Pat. No. 5,106,926 provides another example of a magnesium/titanium based catalyst system comprising:

(a) a catalyst precursor having the formula $Mg_dTi(OR)_eX_f(ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is 1.5d+2;

(b) at least one modifier having the formula $BX_3$ or $AlR_{(3-e)}X_e$ wherein each R is alkyl or aryl and is the same or different, and X and e are as defined above for component (a)

wherein components (a) and (b) are impregnated into an inorganic support; and (c) a hydrocarbyl aluminum cocatalyst.

The precursor is prepared from a titanium compound, a magnesium compound, and an electron donor. Titanium compounds, which are useful in preparing these precursors, have the formula $Ti(OR)_eX_h$ wherein R, X, and e are as defined above for component (a); h is an integer from 1 to 4; and e+h is 3 or 4. Examples of titanium compounds are $TiCl_3$, $TiCl_4$, $Ti(OC_2H_5)_2Br_2$, $Ti(OC_6H_5)$ $Cl_3$, $Ti(OCOCH_3)$ $Cl_3$, and $Ti(OCOC_6H_5)$ $Cl_3$. The magnesium compounds include magnesium halides such as $MgCl_2$, $MgBr_2$, and $MgI_2$. Anhydrous $MgCl_2$ is a preferred compound. About 0.5 to 56, and preferably about 1 to 10, moles of the magnesium compounds are used per mole of titanium compounds.

The electron donor, the support, and the cocatalyst are the same as those described above. As noted, the modifier can be similar in chemical structure to the aluminum containing activators. The modifier has the formula $BX_3$ or $AlR_{(3-e)}X_e$ wherein each R is independently alkyl having 1 to 14 carbon atoms; each X is independently chlorine, bromine, or iodine; and e is 1 or 2. One or more modifiers can be used. Preferred modifiers include alkylaluminum mono- and dichlorides wherein each alkyl radical has 1 to 6 carbon atoms; boron trichloride; and the trialkylaluminums. About 0.1 to about 10 moles, and preferably about 0.2 to about 2.5 moles, of modifier can be used per mole of electron donor. The molar ratio of modifier to titanium can be in the range of about 1:1 to about 10:1 and is preferably in the range of about 2:1 to about 5:1.

The entire catalyst system, which includes the precursor or activated precursor and the cocatalyst, is added to the first reactor. The catalyst is admixed with the copolymer produced in the first reactor, and the mixture is transferred to the second reactor. Insofar as the catalyst is concerned, only cocatalyst is added to the second reactor from an outside source.

The polymerization in each reactor is, preferably, conducted in the gas phase using a continuous fluidized process. A typical fluidized bed reactor is described in U.S. Pat. No. 4,482,687.

A relatively low melt index (or high molecular weight) copolymer is preferably prepared in the first reactor, and the relatively high melt index (or low molecular weight) copolymer is prepared in the second reactor. This can be referred to as the forward mode. Alternatively, the relatively low molecular weight copolymer can be prepared in the first reactor and the relatively high molecular weight copolymer can be prepared in the second reactor. This can be referred to as the reverse mode.

The first reactor is generally smaller in size than the second reactor because only a portion of the final product is made in the first reactor. The mixture of polymer and an active catalyst is usually transferred from the first reactor to the second reactor via an interconnecting device using nitrogen or second reactor recycle gas as a transfer medium.

In the high molecular weight reactor:

Because of the low values, instead of melt index, flow index is determined and those values are used in this specification. The flow index can be in the range of about 0.01 to about 30 grams per 10 minutes, and is preferably in the range of about 0.2 to about 6 grams per 10 minutes. The molecular weight of this polymer is, generally, in the range of about 400,000 to about 480,000. The density of the copolymer is at least 0.860 gram per cubic centimeter, and is preferably in the range of 0.900 to 0.940 gram per cubic centimeter. The melt flow ratio of the polymer can be in the range of about 20 to about 70, and is preferably about 22 to about 45.

Melt index is determined under ASTM D-1238, Condition E. It is measured at 190° C. and 2.16 kilograms and reported as grams per 10 minutes. Flow index is determined under ASTM D-1238, Condition F. It is measured at 190° C. and 10 times the weight used in determining the melt index, and reported as grams per 10 minutes. Melt flow ratio is the ratio of flow index to melt index.

In the low molecular weight reactor:

A relatively high melt index (or low molecular weight) copolymer is prepared in this reactor. The high melt index can be in the range of about 50 to about 3000 grams per 10 minutes, and is preferably in the range of about 100 to about 1500 grams per 10 minutes. The molecular weight of the high melt index copolymer is, generally, in the range of about 14,000 to about 30,000. The density of the copolymer prepared in this reactor can be at least 0.900 gram per cubic centimeter, and is preferably in the range of 0.905 to 0.970 gram per cubic centimeter. The melt flow ratio of this copolymer can be in the range of about 20 to about 70, and is preferably about 20 to about 45.

The blend or final product, as removed from the second reactor, can have a flow index in the range of about 40 to about 150 grams per 10 minutes, and preferably has a flow index in the range of about 45 to about 145 grams per 10 minutes. The melt flow ratio can be in the range of about 50 to about 150. The molecular weight of the final product is, generally, in the range of about 90,000 to about 250,000. The density of the blend can be at least 0.908 gram per cubic centimeter, and is preferably in the range of 0.910 to 0.930 gram per cubic centimeter.

The broad molecular weight distribution is reflected in an Mw/Mn ratio of about 8 to about 22, preferably about 9 to about 20. Mw is the weight average molecular weight; Mn is the number average molecular weight; and the Mw/Mn ratio can be referred to as the polydispersity index, which is a measure of the breadth of the molecular weight distribution.

The magnesium/titanium based catalyst system, ethylene, alpha-olefin, and hydrogen are continuously fed into the first reactor; the polymer/catalyst mixture is continuously transferred from the first reactor to the second reactor; ethylene, alpha-olefin, and hydrogen, as well as cocatalyst are continuously fed to the second reactor. The final product is continuously removed from the second reactor.

In the low melt index, as reflected in flow index, reactor:

The mole ratio of alpha-olefin to ethylene can be in the range of about 0.05:1 to about 0.4:1, and is preferably in the range of about 0.09:1 to about 0.26:1. The mole ratio of hydrogen (if used) to ethylene can be in the range of about 0.0001:1 to about 0.3:1, and is preferably in the range of about 0.001:1 to about 0.18:1. The operating temperature is generally in the range of about 60° C. to about 100° C. Preferred operating temperatures vary depending on the density desired, i.e., lower temperatures for lower densities and higher temperatures for higher densities.

In the high melt index reactor:

The mole ratio of alpha-olefin to ethylene can be in the range of about 0.1:1 to about 0.6:1, and is preferably in the range of about 0.2:1 to about 0.45:1. The mole ratio of hydrogen to ethylene can be in the range of about 1:1 to about 3:1, and is preferably in the range of about 1.6:1 to about 2.2:1. The operating temperature is generally in the range of about 70° C. to about 100° C. As mentioned above, the temperature is preferably varied with the desired density.

The pressure is generally the same in both the first and second reactors. The pressure can be in the range of about 200 to about 450 psi and is preferably in the range of about 280 to about 350 psig.

A typical fluidized bed reactor can be described as follows:

The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate.

Conventional additives, which can be introduced into the blend, are exemplified by antioxidants, ultraviolet absorbers, antistatic agents, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents. Aside from the fillers, the additives can be present in the blend in amounts of about 0.1 to about 10 parts by weight of additive for each 100 parts by weight of polymer blend. Fillers can be added in amounts up to 200 parts by weight and more for each 100 parts by weight of the blend.

A typical process for the preparation of the in situ blend, blending the in situ blend with LLDPE, and extruding the in situ blend/LLDPE mixture is as follows:

The preferred catalyst system is one where the precursor is formed by spray drying and is used in slurry form. Such a catalyst precursor, for example, contains titanium, magnesium, an electron donor, and an aluminum halide. The precursor is then introduced into a hydrocarbon medium such as mineral oil to provide the slurry form. For the catalyst composition and the method of preparing same, see U.S. Pat. No. 5,290,745.

The in situ polyethylene blend can be produced using the following typical procedure:

Ethylene is copolymerized with 1-hexene and 1-butene. Trimethylaluminum (TMA) cocatalyst is added to each reactor during polymerization. The pressure in each reactor is 300 psia. Each polymerization is continuously conducted after equilibrium is reached.

Polymerization is initiated in the first reactor by continuously feeding the above catalyst precursor and cocatalyst, TMA, into a fluidized bed of polyethylene granules together with ethylene, 1-hexene, and hydrogen. The TMA is first dissolved in isopentane (5 percent by weight TMA). The resulting copolymer mixed with active catalyst is withdrawn from the first reactor and transferred to the second reactor using nitrogen as a transfer medium. The second reactor also contains a fluidized bed of polyethylene granules. Ethylene, 1-butene, and hydrogen are introduced into the second reactor where they come into contact with the copolymer and catalyst from the first reactor. Additional cocatalyst is also introduced. The product blend is continuously removed.

The in situ blend is blended in a conventional mixer with (i) a 1-butene LLDPE having a density of 0.918 gram per cubic centimeter and a melt index of 1 gram per 10 minutes or (ii) a 1-hexene LLDPE having a density of 0.918 gram per cubic centimeter and a melt index of 1 gram per 10 minutes in weight ratios of 40/60, 30/70, and 20/80 (in situ blend/LLDPE) and extruded at die rates of 14, 10, 6, 4, and 3 pounds per hour per inch of die circumference and a die gap of 0.036 inch.

The in situ blend/LLDPE mixtures in the various ratios and the aforementioned die gap are extruded in a 3.5 inch Gloucester™ blown film extruder having a 0.036 inch die gap; a 6 inch die; and a L/D ratio of 24:1. The extruder is operated at a die rate of 3 to 14 pounds/hour/inch of die circumference; at a melt temperature of 415° F.; and a blow up ratio of 3:1. One mil films are produced.

Density is measured by producing a plaque in accordance with ASTM D-1928, procedure C, and then testing as is via ASTM D-1505.

Melt flow ratio is the ratio of flow index to melt index.

The molecular weight distribution is determined via Size Exclusion Chromatography using a Waters™ 150C with trichlorobenzene as solvent at 140 degrees C. with a broad molecular weight distribution standard and broad molecular weight distribution calibration method.

Die rate is defined as pounds per hour per inch of die circumference.

Blow up ratio is the ratio of the bubble diameter to the die diameter.

Melt fracture is determined by visually examining the film. Each film is given a value from 1 to 9 with the value 1 being the worst case of melt fracture and the value 9 representing essentially no melt fracture as follows:

1=severely gross
2=gross
3=gross shark skin
4=severe shark skin
5=shark skin
6=rough surface
7=slightly rough surface
8=minor imperfection, but acceptable
9=essentially no melt fracture The 40/60 films exhibit essentially no melt fracture (9); the 30/70 films exhibit minor imperfections, but are acceptable (8); 20/80 films exhibit values in the range of (3) to (7) and are unacceptable. Films consisting essentially of LLDPE exhibit values of (1) and (2), which represent heavy melt fracture even at very low die rates, e.g., of 3 or 4 pounds per hour per inch of die circumference.

The primary advantage of the film of the invention is that the film is essentially free of melt fracture. Another advantage is ease of extrudability due to lower extruder head pressures.

Patents mentioned in this specification are incorporated by reference herein.

The invention is illustrated by the following examples.

EXAMPLES

The process for the preparation of the in situ blend used in the examples is carried out in the reverse mode, i.e., the low molecular weight copolymer is prepared in the first reactor; transferred together with active catalyst to the second reactor; and blended in situ with the high molecular weight copolymer, which is prepared in the second reactor.

The catalyst precursor is formed by spray drying and is used in slurry form. It contains titanium, magnesium, and aluminum halides, and an electron donor, and is attached to the surface of silica. The precursor is then introduced into a hydrocarbon medium such as mineral oil to provide the slurry form. See U.S. Pat. No. 5,290,745 ('745). The catalyst precursor and method of preparing same used in the examples is the same composition and preparation method as example 1 of '745. For low density operation, such as that described herein, a reduced catalyst precursor is used. Typically, the molar ratio of diethylaluminum chloride (DEAC) to tetrahydrofuran (THF) is 0.45 and the molar ratio of tri-n-hexylaluminum to tetrahydrofuran is 0.20. The addition of diethylaluminum chloride and tri-n-hexylaluminum (TnHAl) is achieved by an in-line reduction system in which the diethylaluminum chloride and tri-n-hexylaluminum are fed to the reactor concurrently with the catalyst precursor in order to produce a reduced catalyst.

Ethylene is copolymerized with a comonomer in each of two fluidized bed reactors. Each polymerization is continuously conducted after equilibrium is reached.

Polymerization is initiated in the first reactor by continuously feeding the above catalyst precursor and cocatalyst, trimethylaluminum (TMA), into a fluidized bed of polyethylene granules together with ethylene, a comonomer, and hydrogen. The cocatalyst is first dissolved in isopentane (5 percent by weight cocatalyst). Higher concentrations of cocatalyst in solution can also be used as well as using the cocatalyst neat. The resulting copolymer mixed with active catalyst is withdrawn from the first reactor and transferred to the second reactor using either nitrogen or second reactor cycle gas as a transfer medium. The second reactor also contains a fluidized bed of polyethylene granules. Again, ethylene, a comonomer, and hydrogen are introduced into the second reactor where the gases come into contact with the copolymer and catalyst from the first reactor. Additional cocatalyst is also introduced. The product blend is continuously removed. This in situ blend is referred to as Resin A.

Resin B and Resin C are each blended with Resin A. Resin B is a linear low density polyethylene (LLDPE). It is a copolymer of ethylene and 1-butene prepared by a conventional low pressure process. Resin B has a melt index of 1 gram per 10 minutes; a flow index of 26 grams per 10 minutes; a melt flow ratio of 26; and a density of 0.920 gram per cubic centimeter. Resin C is also an LLDPE. It is a copolymer of ethylene and 1-hexene prepared by a conventional low pressure process. Resin C has a melt index of 0.9 gram per 10 minutes; a flow index of 23 grams per 10 minutes; a melt flow ratio of 25.6; and a density of 0.920 gram per cubic centimeter.

In addition to polymerization conditions for Resin A in Table I, resin properties of the blend of Resins A and B and Resins A and C, film extrusion conditions, and film properties are given in Tables II to V.

The equipment for extruding the blends into film is a 90 millimeter (3½ inches) Gloucester™ extruder having a DSB II screw; a 150 millimeter (6 inch) die; and a 0.9 millimeter (35 mil) die gap. The screw revolutions per minute (rpm) is 35 in Table II; 36 in Table IV; and variable in Tables III and V.

TABLE I

| reaction conditions | reactor I | reactor II |
|---|---|---|
| temperature (° C.) | 85 | 72 |
| pressure (psia) | 298 | 251 |
| C2 partial pressure (psia) | 66.7 | 53 |
| H2/C2 molar ratio | 1.96 | 0.018 |
| C4/C2 molar ratio | 0.28 | 0 |
| C6/C2 molar ratio | 0 | 0.166 |
| C2 feed (lbs/hr) | 15250 | 10639 |
| H2 feed (lbs/hr) | 19.3 | 0.065 |
| C4 feed (lbs/hr) | 1186 | 0 |
| C6 feed (lbs/hr) | 0 | 2964 |
| cocatalyst | 10% TMA | 10% TMA |
| catalyst feed rate (lbs/hr) | 8.87 | |
| production rate (lbs/hr) | 16072 | 12725 |
| total production rate (lbs/hr) | — | 28797 |
| ethylene split | 0.589 | 0.411 |
| titanium split | 0.591 | 0.409 |
| fluidized bulk density (lbs/cu ft) | 15.54 | 14.4 |
| bed weight (lbs) | 62210 | 60225 |
| bed level (ft) | 39.3 | 37.2 |
| bed volume (cu ft) | 4003 | 4182 |
| residence time (hrs) | 3.871 | 2.091 |
| STY (lbs/hr/cu ft) | 4.01 | 3.04 |

TABLE II

| Percent by weight | 100 | 90/10 | 70/30 | 50/50 | 10/90 |
|---|---|---|---|---|---|
| Resin A/Resin B | A | A/B | A/B | A/B | A/B |
| MI (gm/10 min) | 1.2 | 0.9 | 0.95 | 1.0 | 0.98 |
| HLMI (gm/10 min) | 122.0 | 71.0 | 60.0 | 45.0 | 34.0 |
| MFR | 99.0 | 82.0 | 61.0 | 44.0 | 35.0 |
| Density (gm/cu cm) | 0.921 | 0.921 | 0.920 | 0.920 | 0.923 |

TABLE II-continued

| Extrusion Conditions, Bubble Stability, and Melt Fracture: | | | | | | | |
|---|---|---|---|---|---|---|---|
| Melt Temperature (C. °) | | 214 | 216 | 217 | 217 | 229 | |
| Head Pressure (psi) | | 3350 | 3700 | 4400 | 5150 | 6800 | |
| % Amps | | 95 | 100 | 120 | 130 | 170 | |
| Die Rate (lbs/hr/in) | | 8.2 | 8.2 | 8.8 | 9.0 | 10.5 | |
| Specific Output Rate (lbs/hr/rpm) | | 4.3 | 4.3 | 4.6 | 4.7 | 5.5 | |
| Bubble Stability | | GOOD | GOOD | GOOD | GOOD | GOOD | |
| Melt Fracture | | NONE | NONE | NONE | NONE | SLIGHT--CLEARED AFTER 45 MIN. | |
| Film Properties: [1 mil film, 3:1 BUR (blow up ratio)] | | | | | | | |
| Tensile Strength | MD | 6300 | 5700 | 5300 | 5700 | 5800 | 4900 |
| (psi) | TD | 4200 | 4500 | 4100 | 4800 | 5200 | 4800 |
| Elongation at break | MD | 500 | 600 | 550 | 600 | 600 | 650 |
| (%) | TD | 700 | 800 | 700 | 800 | 700 | 800 |
| Secant Modulus | MD | 35000 | 37700 | 33000 | 30500 | 39000 | 32000 |
| (psi) | TD | 43900 | 40700 | 41000 | 34000 | 35000 | 35000 |
| Tensile Impact | MD | 1900 | 1800 | 1800 | 1800 | 1700 | 1600 |
| (ft lbs/cu in) | TD | 1700 | 1300 | 1000 | 1100 | 1000 | 975 |
| Elmendorf Tear | MD | 140 | 200 | 250 | 250 | 270 | 200 |
| (gm/mil) | TD | 1000 | 800 | 700 | 600 | 440 | 400 |
| Puncture (load/mil) | | 6.5 | 6.0 | 6.0 | 5.0 | 7.0 | 6.0 |
| Dart Drop (gm/mil) | | 115 | 125 | 116 | 118 | 100 | 95 |
| Film Properties: (2 mil film, 2:1 BUR) | | | | | | | |
| Tensile Strength | MD | 4600 | 5300 | 4800 | 4900 | 4700 | 4900 |
| (psi) | TD | 3700 | 3600 | 4200 | 4100 | 4400 | 4400 |
| Elongation at break | MD | 700 | 700 | 700 | 700 | 700 | 900 |
| (%) | TD | 900 | 900 | 900 | 800 | 800 | 900 |
| Secant Modulus | MD | 36400 | 37600 | 36000 | 31000 | 35000 | 33600 |
| (psi) | TD | 42000 | 45000 | 41000 | 38000 | 38000 | 39000 |
| Tensile Impact | MD | 1300 | 1600 | 1700 | 1600 | 1700 | 1600 |
| (ft lbs/cu in) | TD | 700 | 800 | 800 | 700 | 800 | 750 |
| Elmendorf Tear | MD | 176 | 175 | 200 | 170 | 175 | 200 |
| (gm/mil) | TD | 550 | 700 | 450 | 460 | 375 | 325 |
| Puncture (load/mil) | | 5.4 | 6.0 | 6.0 | 5.0 | 6.0 | 6.0 |
| Dart Drop (gm/mil) | | 92 | 100 | 106 | 103 | 95 | 88 |
| Film Properties: (2 mil film, 3:1 BUR) | | | | | | | |
| Tensile Strength | MD | 4100 | 4400 | 4500 | 4500 | 4600 | 4900 |
| (psi) | TD | 3500 | 3600 | 4100 | 4000 | 4600 | 4700 |
| Elongation at break | MD | 700 | 700 | 700 | 700 | 700 | 800 |
| (%) | TD | 800 | 800 | 800 | 800 | 800 | 900 |
| Secant Modulus | MD | 36000 | 37000 | 35000 | 33000 | 32000 | 33000 |
| (psi) | TD | 40300 | 39000 | 38000 | 34000 | 34000 | 35000 |
| Tensile Impact | MD | 1300 | 1700 | 1700 | 1600 | 1500 | 1400 |
| (ft lbs/cu in) | TD | 1300 | 1300 | 1000 | 1000 | 900 | 900 |
| Elmendorf Tear | MD | 260 | 250 | 260 | 275 | 230 | 220 |
| (gm/mil) | TD | 550 | 500 | 400 | 400 | 350 | 326 |
| Puncture (load/mil) | | 6.0 | 6.0 | 6.0 | 5.0 | 6.0 | 6.0 |
| Dart Drop (gm/mil) | | 138 | 138 | 114 | 112 | 95 | 90 |
| Film Properties: (1 mil film, 2:1 BUR) | | | | | | | |
| Tensile Strength | MD | 5400 | 6600 | 5100 | 5700 | 5700 | 5000 |
| (psi) | TD | 3800 | 4000 | 4000 | 4300 | 4800 | 4700 |
| Elongation at break | MD | 550 | 500 | 500 | 600 | 600 | 800 |
| (%) | TD | 800 | 800 | 700 | 800 | 800 | 900 |
| Secant Modulus | MD | 37000 | 36500 | 36000 | 33500 | 34700 | 35000 |
| (psi) | TD | 46000 | 48000 | 41000 | 37500 | 39800 | 38700 |
| Tensile Impact | MD | 1800 | 1800 | 1700 | 1700 | 1800 | 1500 |
| (ft.lbs/in^3)) | TD | 800 | 700 | 700 | 600 | 700 | 700 |
| Elmendorf Tear | MD | 110 | 90 | 170 | 200 | 200 | 215 |
| (gm/mil) | TD | 980 | 1100 | 700 | 700 | 500 | 300 |
| Puncture (load/mil) | | 6.0 | 6.0 | 6.0 | 5.0 | 6.5 | 6.0 |
| Dart Drop (gm/mil) | | 120 | 77 | 95 | 98 | 90 | 91 |

TABLE III

| Percent by weight Resin A/Resin B | 50/50 A/B | 30/70 A/B | 15/85 A/B | 100 B |
|---|---|---|---|---|
| MI (gm/10 min) | 0.95 | 1.0 | 1.0 | 1.0 |
| HLMI (gm/10 min) | 60.0 | 45.0 | 40.0 | 26.0 |
| MFR | 61.0 | 44.0 | 30.5 | 24.0 |
| Density (gm/cu cm) | 0.920 | 0.920 | 0.920 | 0.920 |
| Extrusion Characteristics, Bubble Stability, and Melt Fracture | | | | |
| Screw RPM | 45 | 45 | 45 | 10 |
| Melt Temperature (° C.) | 225 | 231 | 229 | 232 |
| Head Pressure (psi) | 5600 | 6400 | 6700 | 3500 |
| Amps | 140 | 160 | 165 | 80 |
| Die Rate (lbs/hr/in) | 10.7 | 12.5 | 12.0 | 6.8 |
| Specific Output Rate (lbs/hr/rpm) | 4.5 | 5.2 | 5.0 | 6.0 |
| Bubble Stability | GOOD | GOOD | GOOD | GOOD |
| Melt Fracture | NONE | NONE | NONE | GROSS |

TABLE IV

| Percent by weight Resin A/Resin C | 100 A | 90/10 A/C | 70/30 A/C | 50/50 A/C | 30/70 A/C | 10/90 A/C |
|---|---|---|---|---|---|---|
| MI (gm/10 min) | 1.2 | 0.8 | 0.8 | 0.8 | 0.8 | 0.8 |
| HLMI (gm/10 min) | 122 | 67.0 | 42 | 39 | 29.5 | 24.0 |
| MFR | 99 | 87.0 | 52 | 48 | 37 | 29.0 |
| Density (gm/cu cm) | 0.921 | 0.921 | 0.921 | 0.920 | 0.920 | 0.920 |
| Extrusion Conditions, Bubble Stability, and Melt Fracture: | | | | | | |
| Melt Temperature (° C.) | 211 | 222 | 227 | 221 | 222 | 226 |
| Head Pressure (psi) | 3350 | 3900 | 4950 | 5400 | 6250 | 7000 |
| % Amps | 95 | 100 | 120 | 130 | 150 | 180 |
| Die Rate (lbs/hr/in) | 8.2 | 8.3 | 8.8 | 8.8 | 9.4 | 10.57 |
| Specific Output Rate (lbs/hr/rpm) | 4.3 | 4.3 | 3.7 | 4.6 | 4.9 | 5.6 |
| Bubble Stability | GOOD | GOOD | GOOD | GOOD | GOOD | GOOD |
| Melt Fracture | NONE | NONE | NONE | NONE | NONE | GROSS |
| Film Properties: (1 mil film, 2:1 BUR) | | | | | | |
| Tensile Strength (psi) MD | 5400 | 6200 | 5800 | 6300 | 6700 | 6300 |
| TD | 3800 | 4300 | 4600 | 5800 | 5900 | 6200 |
| Elongation at break (%) MD | 550 | 500 | 550 | 600 | 600 | 600 |
| TD | 800 | 750 | 800 | 800 | 800 | 800 |
| Secant Modulus (psi) MD | 37000 | 39000 | 38700 | 40000 | 36000 | 38000 |
| TD | 46000 | 45000 | 47000 | 48000 | 44000 | 44000 |
| Tensile Impact (ft lbs/cu in) MD | 1800 | 1800 | 1900 | 1900 | 2000 | 2000 |
| TD | 800 | 900 | 1200 | 1300 | 1400 | 1400 |
| Elmendorf Tear (gm/mil) MD | 110 | 175 | 200 | 200 | 230 | 350 |
| TD | 980 | 890 | 900 | 800 | 750 | 700 |
| Puncture (load/mil) | 6.0 | 7.0 | 7.5 | 8.0 | 7.0 | 8.5 |
| Dart Drop (gm/mil) | 120 | 116 | 104 | 125 | 127 | 82 |
| Film Properties: (2 mil film, 2:1 BUR) | | | | | | |
| Tensile Strength (psi) MD | 4600 | 4700 | 3900 | 6000 | 5600 | 6400 |
| TD | 3700 | 3800 | 4000 | 5300 | 5300 | 5800 |
| Elongation at break (%) MD | 700 | 700 | 600 | 800 | 800 | 800 |
| TD | 900 | 800 | 850 | 900 | 900 | 850 |
| Secant Modulus (psi) MD | 36400 | 39700 | 38000 | 38000 | 36500 | 34000 |
| TD | 42000 | 43700 | 44700 | 47800 | 43000 | 42000 |
| Tensile Impact (ft lbs/cu in) MD | 1600 | 1700 | 1900 | 2000 | 1900 | 2000 |
| TD | 700 | 1000 | 1300 | 1500 | 1500 | 1500 |
| Elmendorf Tear (gm/mil) MD | 176 | 230 | 250 | 300 | 300 | 400 |
| TD | 550 | 550 | 700 | 600 | 650 | 600 |
| Puncture (load/mil) | 5.4 | 6.0 | 6.5 | 7.0 | 7.0 | 7.0 |
| Dart Drop (gm/mil) | 92 | 107 | 112 | 125 | 127 | 106 |
| Film Properties: (1 mil film, 3:1 BUR) | | | | | | |
| Tensile Strength (psi) MD | 6300 | 6100 | 6500 | 6800 | 7000 | 7200 |
| TD | 4200 | 4800 | 5200 | 5000 | 5800 | 7000 |
| Elongation at break (%) MD | 500 | 500 | 600 | 600 | 600 | 650 |
| TD | 700 | 700 | 700 | 775 | 750 | 775 |
| Secant Modulus (psi) MD | 35000 | 38000 | 35000 | 38800 | 37000 | 35000 |
| TD | 43900 | 41600 | 42500 | 44600 | 43000 | 39000 |
| Tensile Impact (ft lbs/cu in) MD | 2100 | 1900 | 1800 | 2000 | 2000 | 1900 |
| TD | 1700 | 1300 | 1700 | 1600 | 1600 | 1800 |
| Elmendorf Tear MD | 140 | 185 | 350 | 275 | 400 | 400 |

TABLE IV-continued

| | | | | | | | |
|---|---|---|---|---|---|---|---|
| (gm/mil) | TD | 1000 | 1000 | 700 | 750 | 700 | 650 |
| Puncture (load/mil) | | 6.5 | 7.0 | 7.0 | 7.0 | 7.0 | 8.0 |
| Dart Drop (gm/mil) | | 115 | 119 | 134 | 133 | 150 | 114 |
| Film Properties: (2 mil film, 3:1 BUR) | | | | | | | |
| Tensile Strength | MD | 4100 | 4700 | 5500 | 5700 | 6100 | 5300 |
| (psi) | TD | 3500 | 4100 | 4700 | 5100 | 5300 | 6100 |
| Elongation at break | MD | 700 | 700 | 800 | 800 | 800 | 600 |
| (%) | TD | 800 | 800 | 800 | 900 | 850 | 900 |
| Secant Modulus | MD | 36000 | 35000 | 37500 | 40000 | 37000 | 35000 |
| (psi) | TD | 40300 | 43000 | 38700 | 42900 | 39000 | 37000 |
| Tensile Impact | MD | 1700 | 1800 | 1900 | 1900 | 1800 | 1900 |
| (ft lbs/cu in) | TD | 1300 | 1300 | 1600 | 1500 | 1600 | 1700 |
| Elmendorf Tear | MD | 260 | 275 | 350 | 450 | 450 | 500 |
| (gm/mil) | TD | 550 | 600 | 600 | 600 | 600 | 600 |
| Puncture (load/mil) | | 6.0 | 6.0 | 6.7 | 7.0 | 7.0 | 6.5 |
| Dart Drop (gm/mil) | | 138 | 122 | 148 | 150 | 156 | 150 |

TABLE V

| | | | |
|---|---|---|---|
| Percent | 50/50 | 15/85 | 100 |
| Resin A/Resin C | A/C | A/C | C |
| MI (gm/10 min) | 0.8 | 1.0 | 0.9 |
| HLMI (gm/10 min) | 39 | 31.0 | 23.0 |
| MFR | 48 | 32.0 | 27.0 |
| Density (gm/cu cm)) | 0.920 | 0.920 | 0.920 |
| Extrusion Conditions, Bubble Stability, and Melt Fracture: | | | |
| Screw RPM | 36 | 45 | 10 |
| Melt Temperature (° C.) | 221 | 231 | 226 |
| Head Pressure (psi) | 5400 | 5900 | 4000 |
| Amps | 130 | 155 | 95 |
| Die Rate (lbs/hr/in) | 8.8 | 10.9 | 3.3 |
| Specific Output Rate (lbs/hr/rpm | 4.6 | 4.6 | 6.3 |
| Bubble Stability | GOOD | GOOD | GOOD |
| Melt Fracture | NONE | NONE | GROSS |

Notes to examples:

1. MI=melt index
2. HLMI=flow index
3. MFR=melt flow ratio
4. Bubble stability is determined by the speed of the line. The faster the speed (prior to failure) the better the bubble stability.
5. Blow-up ratio is the ratio of die diameter to bubble diameter. The bubble diameter is determined as follows: 2× layflat/pi. The "layflat" refers to the width of a flattened bubble.
6. Film gauge is the thickness of the film. The value is given in mils or microns.
7. Dart impact (dart drop) is determined under ASTM D-1709, methods A and B. It is given in grams.
8. Elmendorf Tear is determined under ASTM D-1992. It is given in grams per mil.
9. MD=machine direction
10. TD=transverse direction
11. Tensile Strength is measured in accordance with ASTM D-882.
12. Elongation is measured in accordance with ASTM D-882.
13. Secant Modulus is measured in accordance with ASTM D-882.
14. Puncture resistance: the test is carried out with a metal cylinder, open at both ends, having a diameter of 75 millimeters and a length of 100 millimeters. One open end is covered with the sample film, which is held taut by a metal band surrounding that end of the cylinder (similar to a drum). The cylinder is placed in a vertical position with the film covered end up. Then, the film is pressed with the sharp point of a nail-like rod (5 millimeters in diameter and 150 millimeters in length) and a force is exerted against the film. When the film is broken, the force exerted is measured in grams.
15. STY (lbs/hr/cu ft) is the space time yield defined as the pounds per hour of polymer produced per cubic foot of fluidized bed.

We claim:

1. A film, which has been extruded to a gauge in the range of about 0.5 to about 6 mils, comprising a blend of (i) a linear low density polyethylene having a melt index in the range of about 0.3 to about 3 grams per 10 minutes and a density in the range of 0.900 to about 0.940 gram per cubic centimeter and (ii) a multimodal resin consisting of an in situ blend of copolymers of ethylene and one or more alpha-olefins having 3 to 8 carbon atoms, said resin having a flow index in the range of about 40 to about 150 grams per 10 minutes; a melt flow ratio in the range of about 50 to about 150; an Mw/Mn ratio of about 8 to about 22; and a density in the range of 0.908 to 0.930 gram per cubic centimeter wherein (a) the weight ratio of component (i) to component (ii) is in the range of about 1:1 to about 3:1; (b) the blend has been extruded, under extrusion conditions, at a die rate in the range of about 8 to about 15 pounds per hour per inch of die circumference and at a die gap in the range of about 0.035 to about 0.050 inch; and (c) the film exhibits essentially no melt fracture, component (ii) having been produced in situ by contacting the ethylene and one or more alpha-olefins with a magnesium/titanium based catalyst system in each of two reactors connected in series, under polymerization conditions, wherein the relatively high molecular weight polymer formed in one reactor has a flow index in the range of about 0.2 to about 6 grams per 10 minutes and a density in the range of about 0.900 to about 0.940 gram per cubic centimeter and the relatively low molecular weight polymer formed in the other reactor has a melt index in the range of about 100 to about 1500 grams per 10 minutes and a density in the range of about 0.905 to about 0.970 gram per cubic centimeter, the weight ratio of high molecular weight polymer to the low molecular weight polymer being in the range of about 0.67:1 to about 1.5:1.

2. The film defined in claim 1 wherein component (ii) is produced under the following conditions:
   (i) in the reactor in which the high molecular weight polymer is made: the mole ratio of alpha-olefin to ethylene is in the range of about 0.05:1 to about 0.4:1 and the mole ratio of hydrogen, if used, to ethylene is in the range of about 0.0001:1 to about 0.3:1; and
   (ii) in the reactor in which the low molecular weight polymer is made: the mole ratio of alpha-olefin to ethylene is in the range of about 0.1:1 to about 0.6:1 and the mole ratio of hydrogen to ethylene is in the range of about 1:1 to about 2.5:1.

* * * * *